March 4, 1930.  L. M. BEARLAND  1,749,690
TURN SIGNAL
Filed June 24, 1927  2 Sheets-Sheet 1

Lawrence M. Bearland INVENTOR

March 4, 1930.  L. M. BEARLAND  1,749,690
TURN SIGNAL
Filed June 24, 1927  2 Sheets-Sheet 2
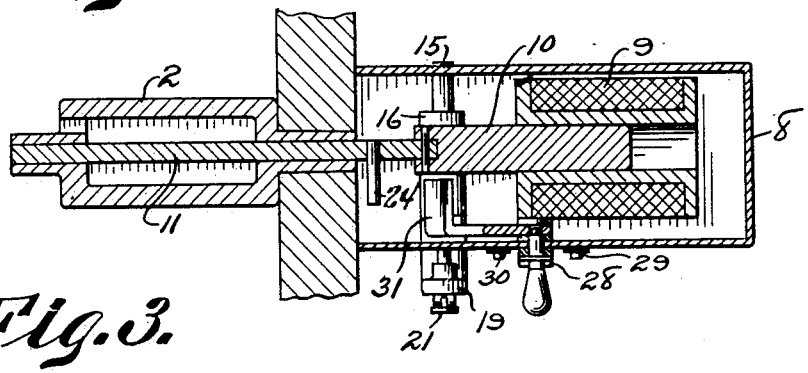
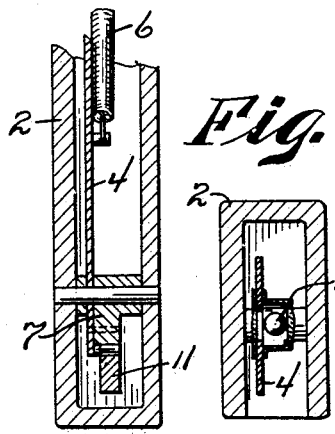
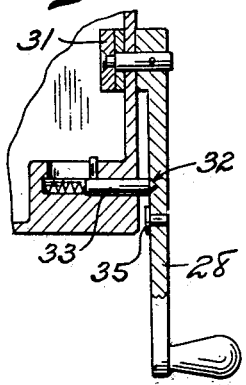
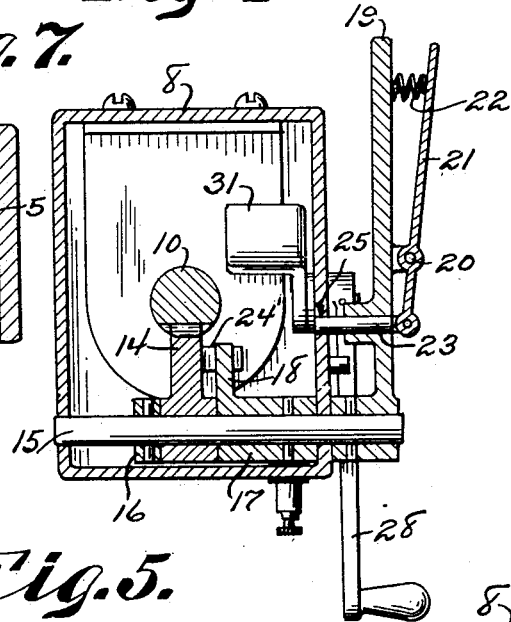
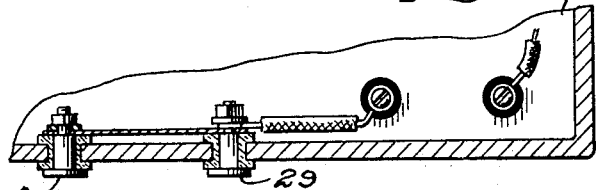
Lawrence M. Bearland INVENTOR
BY Victor J. Evans
WITNESS: John Donovan
ATTORNEY Patented Mar. 4, 1930

1,749,690

UNITED STATES PATENT OFFICE

LAWRENCE M. BEARLAND, OF MISSOULA, MONTANA

TURN SIGNAL

Application filed June 24, 1927. Serial No. 201,242.

My present invention has reference to a direction signal for automobiles or similar vehicles and my object is the provision of a device for this purpose that can be either manually or electrically operated.

A further and important object of the invention is to arrange along the side of a vehicle a housing in which there is pivoted a signal arm, and to provide either electrical or mechanical means operable one independent of the other for swinging the signal arm from the casing to positions to indicate to traffic in the rear of the vehicle the direction the vehicle is to take.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claim.

In the drawings:

Figure 1 is a sectional view through one side of a vehicle equipped with the improvement, the casing for the signal arm being also in section.

Figure 2 is a sectional view on the line 2—2 of Figure 1.

Figure 3 is a sectional view on the line 3—3 of Figure 1.

Figure 4 is a sectional view on the line 4—4 of Figure 1.

Figure 1:
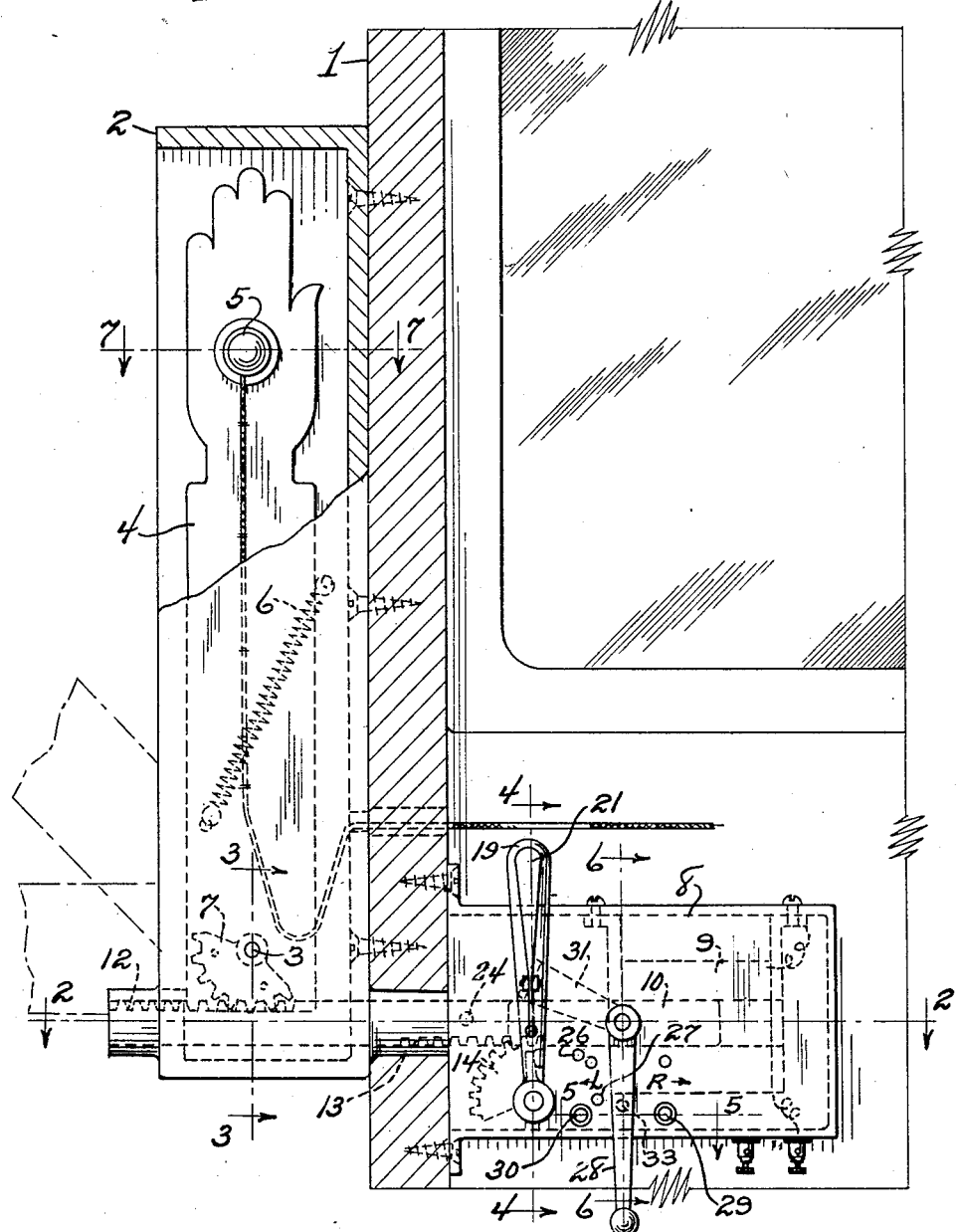

Figure 5 is a sectional view on the line 5—5 of Figure 1.

Figure 6 is a sectional view on the line 6—6 of Figure 1.

Figure 7 is a sectional view on the line 7—7 of Figure 1.

The improvement primarily is devised for use in connection with the closed type of automobiles, but may, of course, be successfully employed upon other classes of like vehicles.

In Figure 1 of the drawings, one side of a motor driven vehicle is indicated by the numeral 1. On the side 1 there is fixed a vertically arranged casing 2 that has its outer face open. In this casing there is pivoted, as at 3, a signal arm 4. The arm has arranged therein a lamp bulb 5 that is visible from both faces of the same arm, the said bulb being wired to the electric system of the automobile. The circuit is normally broken, but has contacts that close the circuit when the signal arm is swung to signaling position. As this construction is old and well known in the art I have not deemed it necessary to illustrate the same.

Between the casing 2 and the signal arm 4 there is a spring 6 which normally influences the signal arm into the casing. On the pivot 3 for the signal arm there is fixedly secured a toothed segment 7.

On the inner face of the side 1 of the automobile body there is a substantially rectangular housing 8. In this housing there is fixedly secured a solenoid 9. The core of the solenoid is indicated by the numeral 10. To the core 10 there is fixed one end of a plate 11. The plate is in the nature of a rack bar, and the same has both of its edges, adjacent to its ends, toothed, as at 12, and 13 respectively. The outer teeth 12 are in mesh with the toothed segment 7, and the inner teeth 13, which are arranged in the housing 8, are in mesh with a second segmental rack 14. It is, of course, to be understood that the bar or plate 11 is suitably guided through the housing and through the casing 2 and is held from other than longitudinal movement in both of these members.

Journaled through suitable bearing openings arranged transversely in the housing 8 there is a shaft 15, and on this shaft the toothed segment 14 is loosely journaled. On the shaft, at the part thereof in the housing there are stop sleeves or collars 16 and 17 that are arranged to the opposite sides of the hub of the toothed segment 14 and both of these members 16 and 17 are fixed to the shaft. The member 17 has an offset portion in the nature of a finger 18, the purpose of which will presently be described.

Fixed on the outer end of the shaft 15, that is the end that extends through the housing 8, there is a lever 19. On the lever there is pivotally secured, as at 20, a handle 21 that is influenced in one direction through the medium of a spring 22. On the second end of the handle 21 there is pivoted a dog 23 that passes through a bearing opening in the lever 19, and is designed to enter one of three spaced openings in the outer face of the housing 8.

The toothed segment 14 has on one of its faces an offset portion or lug 24' and this lug is in the path of contact with the finger 18 on the sleeve or collar member 17 that is fixed on the shaft 15.

As far as the description has progressed, it will be noted by reference to the drawings that the dog 23 normally engages the opening or aperture 25. The lever 19 is sustained vertically and is in a neutral position. By moving the handle 21 toward the lever 19 to release the dog and the lever is swung so that the dog 23 will enter the notch or aperture 26, the finger 18 on the member 17 fixed to the shaft 15 will contact with the lug 24' on the toothed segment 14, influencing the latter to cause an outward longitudinal movement to the rack bar to cause the upper teeth thereof to act on the toothed segment 7 to swing the signal 4 against the influence of the spring 6 to the upper dotted line position in Figure 1 of the drawings. This indicates that the driver of the vehicle is to turn to the left. By again operating the handle member 21 and swinging the lever 19 to bring the dog 23 into the opening or aperture 27 in the plate 8, the rack bar will have been moved to influence the toothed segment 7 to swing the signal arm to its horizontal position, as indicated by the lower dotted lines in Figure 1 of the drawings. Of course, when the dog has been brought out of engagement with the walls of the openings or apertures 26 and 27 and the lever returned to its initial position, the spring 6 will swing the signal arm into the casing or housing 2.

Of course, the solenoid 9 is wired to the electric circuit for the machine, and when the device is to be electrically operated a handle member, in the nature of a switch 28 is swung against either of two contacts 29 or 30, the contacts, of course, being connected with the wiring system. The lever 28 has on its shaft or trunnion, that finds a bearing in the outer face of the housing 8, an offset portion in the nature of a stop element 31. The inner face of the lever 28 is indented or apertured, as at 32, which is designed for the reception of spring influenced dogs 33. On the bar, provided with the teeth 12 and 13, and which I have termed the rack bar, there is a laterally extending pin 24. When the lever is swung from its normal pendent position to bring its contact 35 against, say the contact 29, the stop element 31 will be swung to contact with the lug or pin 24 on the rack bar so that when the circuit is energized and the core 10 is drawn into the solenoid 9, the longitudinal movement of the rack bar is limited and the signal arm 4 is swung through the casing 2 to its angular position, but when the lever is swung to engage with the contact 30, the stop 31 is moved away from engagement with the pin or lug 24 so that the core 10 will fully enter the solenoid and the signal arm will be swung to horizontal position.

My improvement and the advantages thereof, will, it is thought, be understood and appreciated by those skilled in the art to which the invention relates when the foregoing description has been carefully read in connection with the accompanying drawings, it being apparent that the device is of a simple construction, may be installed in an easy and expeditious manner upon varying types of automobiles and that the same may be operated either by manual or electrical power.

Having described the invention, I claim:—

A signal for the purpose set forth, including a fixed casing having an outer open face, a signal arm in the casing, a pivot for the signal arm, a spring influencing the signal arm into the casing, a toothed segment on the pivot, a rack bar engaging the segment, a solenoid having a core fixed to the rack bar, a shaft, a segmental member freely mounted on the shaft engaging with the rack bar, a lug on said segmental member, a lever on the shaft, a pivotally supported spring influenced handle carried by the lever, a pivoted dog carried by the lever and slidable therethrough, said casing having three concentrically arranged equidistantly spaced openings to receive the dog therethrough, a finger fixed on the shaft and in the path of contact with the lug, spaced contacts in the circuit for the solenoid, a switch lever, a pivot to which the switch lever is connected and said switch lever being also in the solenoid circuit and swingable to engage with the contacts, said lever having its inner face indented, spring influenced dogs to engage in the said indenture of the switch lever when the switch lever is swung to engage with the several contacts and a contact element on the pivot for the switch lever swingable in the path of the lug on the segment when the switch lever is swung to engage with any of the several contacts.

In testimony whereof I affix my signature.

LAWRENCE M. BEARLAND.